though the connector assemblies according to this invention have particular utility with a corrugated hose

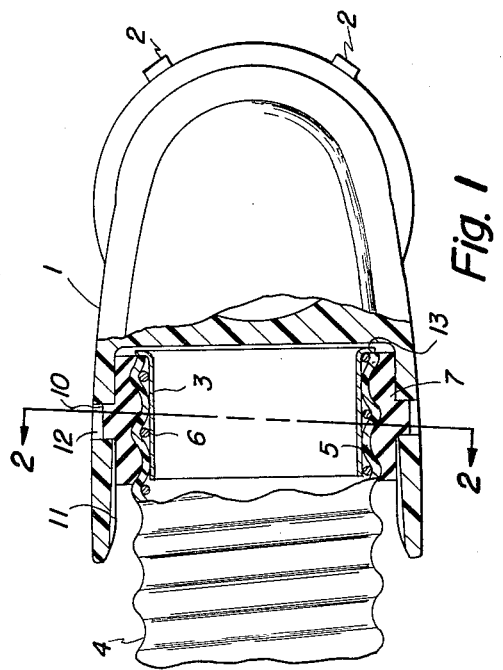
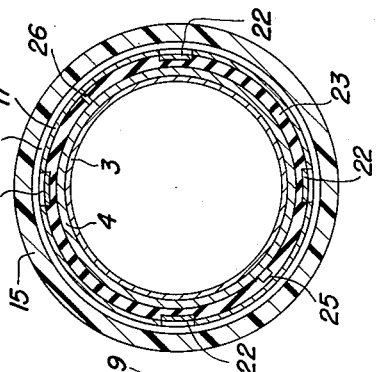
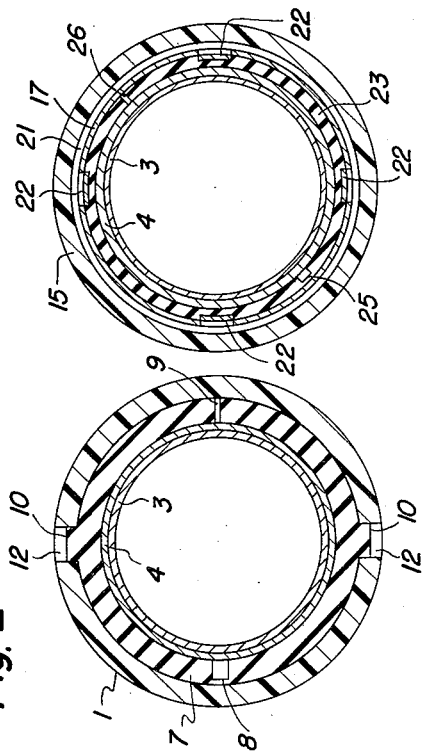
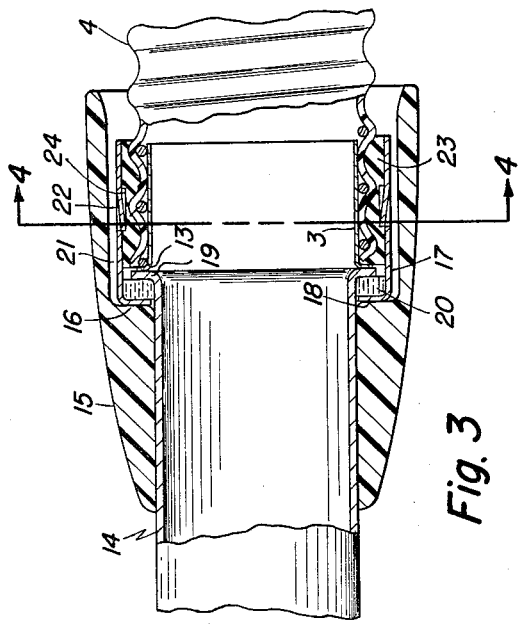
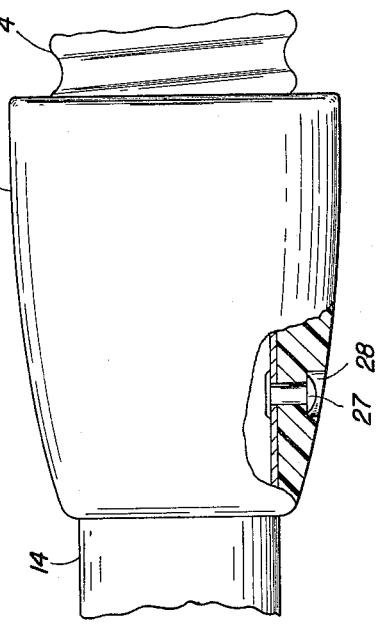

United States Patent Office 3,212,795
Patented Oct. 19, 1965

3,212,795
CONNECTING DEVICES
Mark W. Helm and Warren A. Humphrey, Canton, and Melvin H. Ripple, North Canton, Ohio, assignors to The Hoover Company, North Canton, Ohio, a corporation of Ohio
Filed July 16, 1962, Ser. No. 209,907
3 Claims. (Cl. 285—7)

This invention relates to a coupling assembly for connecting hollow members together.

More particularly, this invention relates to a coupling assembly for a rigid hollow member and a collapsible hollow member such as a vacuum cleaner wand and a hose or a hose and an inlet connector to a vacuum cleaner.

According to one embodiment of this invention, a coupling member is used to connect two other members while preventing axial movement. Also, according to the one embodiment, the coupling and telescoping members are easily assembled. Removal of the coupling and telescoping members, however, is precluded except through use of an applicable tool.

According to the second embodiment, part of the connecting assembly is rigidly attached or connected to the rigid telescoping member with the flexible or collapsible member rotatable relative thereto. Once this assembly is completed, the parts are difficult to remove. In the second embodiment, the part of the connecting assembly attached to the rigid telescoping member also functions as convenient handle for the operator of an appliance, such as a vacuum cleaner.

It is, therefore, an object of this invention to provide an improved connecting assembly for hollow members.

It is another object of this invention to provide a coupling for two members which is characterized by ease of assembly, low cost and which is relatively difficult to disassemble in the absence of tools. With the use of tools, however, the assembly is easily dismantled.

It is still another object of this invention to provide a coupling for two members wherein the two members are relatively rotatable while the coupling prevents relative axial movement.

A more particular object of this invention is to provide a connecting assembly for a flexible hollow hose member and another member which includes a rigid hollow nipple, a flexible hose telescoped over the nipple, a two-segment inner coupling member, the segments being hinged together and substantially surrounding the hose and nipple, the inner coupling member having radially extending protuberances, an outer coupling member surrounding and compressing the nipple, hose and inner coupling member, the outer coupling member having axially extending grooves spaced to correspond with the protuberances on the inner coupling member, each groove terminating in a radially extending recess so that the protuberances of the inner coupling member are adapted to slide in the groove and fit in the recesses, the recesses being accessible from the exterior of the coupling to enable the protuberances to be compressed inwardly to slide in the grooves to enable the tube, hose and coupling member to be separated.

It is another object of this invention to provide a coupling member in which part of the coupling member is rigidly connected or attached to a hollow, rigid member while allowing relative rotation between the rigid hollow member and the flexible hollow member.

It is still another object of this invention to provide a coupling for two members which is easily assembled but difficult to disassemble.

It is a more particular object of this invention to provide a connecting assembly for a flexible hollow hose member and a hollow tube which includes a rigid hollow nipple, a flexible hose telescoped thereover, a two-segment inner coupling member, the segments being hinged together and substantially surrounding the hose and nipple, the inner coupling member having a circumferential groove on the outer surface, a collar surrounding the inner coupling member with portions thereof extending into and engaging the groove of the inner coupling member so that the inner coupling member and the collar are locked together, a tube being rotatably connected to the collar and an outer member surrounding the nipple, hose, inner coupling member and collar, the outer member being attached to the tube to prevent rotation while allowing rotation of the collar, inner coupling member, hose and nipple.

Further objects and advantages of this invention will become apparent from the following description of illustrative embodiments taken in conjunction with the drawings and claims.

The illustrative embodiments may be best understood by reference to the accompanying drawings in which:

FIGURE 1 is a top view, partially in cross-section, of one embodiment of this invention, FIGURE 2 is an end view in cross-section, taken along the line 2—2 of FIGURE 1, FIGURE 3 is a top view, partially in cross-section, of another embodiment of this invention, FIGURE 4 is an end view, in cross-section, taken along the line 4—4 of FIGURE 3, while FIGURE 5 is a side view, partially broken away, of FIGURE 3.

The prior art discloses many devices for connecting a flexible hose to a rigid hollow member. However, none of these known to us possess the unique advantages of our new connector.

Usually, prior art devices use a rotating means to connect the hose and hollow member together. In addition, many prior art devices use a clamp which holds the two members together.

Also, the unique advantage of simplicity and low cost are obtained through our new connector.

Referring now to FIGURE 1, 1 is an outer coupling member which may connect, for example by means of lugs 2 to the inlet part of a vacuum cleaner. 3 represents a nipple which is telecoped into a hose 4 comprising a tubing 5 and helix or coiled spring 6 which may be constructed according to the U.S. patent to Duff, No. 2,739,616, assigned to the assignee of this application.

Although the connector assemblies according to this invention have particular utility with a corrugated hose with a coiled spring therein, the particular hose configuration is not critical, the above being given only as an example.

Surrounding the hose 4 is a plastic, two-segment, hinged inner connecting member 7. The segments (see FIGURE 2) are connected by an integral plastic hinge 8. Diametrically opposite this hinge is the gap 9 separating the two segments. Bosses or protuberances 10 are formed integrally with the segments and extend radially outward for a purpose to be explained later.

Preferably, the inner surface of the inner connecting member 7 is corrugated as shown in FIGURE 1 corresponding to the corrugations of the hose so as to facilitate gripping. Although not shown, very small webs transverse to the corrugations in member 7 may be used to further grip the hose.

The outer connecting member 1 has formed in it grooves 11 which taper slightly inwardly as viewed from left to right of FIGURE 1. These grooves are circumferentially spaced to correspond with the bosses 10. The inner end of the grooves terminates in outwardly extending apertures 12 for a purpose to be explained later.

To assemble the structure shown in FIGURE 1, the nipple 3 is inserted in the hose 4 until the flange 13 abuts the end of the hose. The inner coupling member 7 is then placed around the hose 4 with the corrugations aligned. The inner coupling member bosses 10 are then aligned with the grooves. A slight radial force is exerted on the bosses to compress the hose and allow the bosses 10 to fit in the grooves 11. As viewed in FIGURE 1, the nipple, hose and inner coupling member 7 are then moved to the right, the bosses 10 sliding in the grooves 11.

Since the grooves 11 taper inwardly toward the right, the hose becomes further compressed by the member 7 as movement to the right occurs. Finally, the bosses 10 reach the apertures 12 and fit therein. It can be seen that a positive lock is formed, preventing uncoupling of the members.

To uncouple the assembly, the bosses 10 need merely be pushed inward by means of a tool or tools and the hose 4 pulled out from the member 1.

In FIGURES 3, 4 and 5, a modified connector assembly is shown. While similar to FIGURE 1 and FIGURE 2, certain differences are apparent.

Thus, the connector assembly is used to couple a rigid tubular wand 14 to a hose 4, the hose being the same as described with reference to FIGURE 1. Instead of a wand, the connector may be used to connect to a vacuum cleaner for example.

An outer coupling member 15 has an abutting portion or flange 16. Mounted interiorly thereof is a collar 17 with an inwardly directed flange 18 abutting flange 16. The wand 14 has an outwardly directed flange 19. A gasket 20, made of a material such as felt, is trapped between the flanges 18 and 19. Between the collar 17 and outer coupling member 15 is a space 21 to facilitate rotation. This space 21, while not necessary, is preferred.

As shown in FIGURE 4, depressions 22 are formed in the collar 17. These may be formed during manufacture or depressed by application of a force after manufacture. In addition, the depressions may take the form of cantilevered tangs. In any event, the portions 22 are formed so as to lock the assembly as explained later. While FIGURE 4 shows four equally spaced portions 24, it is within the scope of this invention to vary the number and spacing.

Also shown in FIGURE 3 is the nipple 3, identical with that shown in FIGURE 1.

The inner coupling member 23, having corrugations similar to the member 7 is formed with an outwardly extending, circumferential groove 24. As shown in FIGURE 3, the depression or tang 22 locks in the groove 24. Like the inner member of FIGURE 1, the member 23 is formed of two identical segments joined by an integral hinge 25 with a gap 26 separating them at a diametrically opposite point (see FIGURE 4).

To prevent rotation between the wand 14 and the outer coupling member 15, FIGURE 5 shows a rivet 27 holding the two together. A depression 28 is formed in the member 15 to preclude the rivet 27 from protruding.

To form the structures shown in FIGURES 3, 4 and 5, the wand 14 is originally without the flange 19. This allows the outer coupling member 15, collar 17 and gasket 20 to be slid on or telescoped over the wand 14. After this, the flange 19 is formed by an convenient means. If the flange 19 is already formed, the members 15, 17 and 20 may be slid on from the other end of the wand 14. The rivet 27 is then inserted to hold the assembly together.

The nipple 3 is then inserted in the hose 4 until the hose abuts the flange 13. The inner coupling member 23 is placed over the hose 4 and the nipple, hose and coupling member inserted in the collar 17. During this insertion, the coupling member compresses the hose over the nipple to prevent any axial movement. When the groove 24 and tang 22 coincide, the tang will enter the groove, locking the whole assembly together. It can be seen that the hose and wand are relatively rotatable.

Although a rivet is shown in FIGURE 5, such would be eliminated if it were desired to provide rotation between members 14 and 15 and other means provided for eliminating axial movement. Such means could comprise a circumferential groove on member 15 and a corresponding projection or projections on member 14 fitting in said groove to allow rotation while preventing axial movement. However, a rivet is preferred because the member 15 acts as a handle when used with a vacuum cleaner. Typically, the member 14 leads to a cleaning tool and is curved. To prevent undesirable swiveling, a rivet is provided, thus insuring control by the operator through means of the handle 15.

It is within the scope of this invention to replace the collar 17 and connector 23 of FIGURE 3 with the connector 7 of FIGURE 1 and to provide the member 15 with the tapering grooves 11 and apertures 12 of FIGURE 1. Gasket 20 may also be removed. In such a construction, the member 15 may or may not be attached to the tube 14. This would result in a structure similar to that shown in FIGURE 1 except that instead of connecting the hose 4 to the inlet of a vacuum cleaner, the hose would be connected to a tube or wand. The embodiment of FIGURE 1 has been described as being adapted for connection to the suction inlet of a vacuum cleaner and the embodiment of FIGURE 3 is shown connected to a tubular wand. Since both the wand and a vacuum cleaner are fluid carrying conduits it is to be understood that at least both of these devices are included in the words "fluid carrying conduit."

The hinged inner coupling member of both modifications is an important feature of this invention. Since the hinge is integral with the two segments, thus forming a one-piece construction, only one mold is needed to make the part. However, the part has the advantage and versatility of separate parts in that the segments are swung apart to encircle the hose and are compressible thereover. Furthermore, even when the member compresses the hose to its greatest extent, a gap remains so that all compression is applied to the hose. Finally, the one-piece construction obviates aligning problems during assembly and only one part is used instead of two.

While various particular embodiments of the invention have been shown, it will be observed by those skilled in the art that various changes and modifications may be made without departing from the invention in its broader aspects. Accordingly, the claims appended hereto are intended to cover all such changes and modifications as fall within the scope of this invention.

What we claim as new and desire to secure by Letters Patent of the United States is:

1. A fluid carrying joint between a flexible hose having a spirally corrugated exterior surface and a fluid carrying conduit comprising:
   (a) a hollow nipple received in an end portion of said flexible hose, said nipple being made of rigid material capable of withstanding radially inward compressive forces,
   (b) an inner two-segment coupling member fitted over and closely embracing said end portion of said tubular member, the total degree of arc defined by the interior surfaces of said two-segment coupling member being slightly less than the exterior circumference of said hose,
   (c) said two-segment coupling member being spirally corrugated on its interior to correspond with the spiral corrugation on the exterior surface of said hose, said spiral corrugation on said two-segment coupling member being interdigitated with said spiral corrugation on said hose,
   (d) an outer coupling member having a conduit therethrough and having a continuous circumferential wall, said outer coupling member being made of rigid material capable of independently withstanding radially outward forces against the inner surface of its wall, said outer coupling member having a coupling end portion and a fluid conduit connecting end portion, said coupling end portion being tightly fitted over said inner coupling member and compressing said inner coupling member and said end portion of said hose radially inward against said hollow nipple, (e) and cooperative interengaging locking means formed integrally on said inner and outer coupling members for preventing relative axial movement therebetween, said locking means comprising radially extending protuberance means on one of said coupling members and radially extending aperture means in the other of said coupling members, said protuberance means being received in said aperture means, (f) said fluid conduit connecting portion of said outer coupling member being directly connected to said fluid carrying conduit.

2. The joint of claim 1 wherein said protuberance means is on the exterior of said inner coupling member and said aperture means extends through the wall of said coupling end portion of said outer coupling member, and longitudinal groove means formed in the inner surface of the wall of said connecting portion of said outer coupling member, said groove means extending axially from said aperture means to the terminal end of said coupling end portion, said groove means being sloped so as to decrease in depth from said terminal end of said coupling end portion toward said aperture means.

3. The joint of claim 1 wherein said protuberance means extends inwardly from the inner surface of the wall of said coupling end portion of said outer coupling member and said aperture means is in the outer surface of said inner coupling member, and wherein said fluid conduit connecting end portion of said outer coupling member is directly rotatably connected to said fluid carrying conduit, said fluid carrying conduit having a collar member secured thereto and extending axially outward from the opening therein and surrounding said outer coupling member.

References Cited by the Examiner

UNITED STATES PATENTS

| | | | |
|---|---|---|---|
| 1,649,752 | 11/27 | Stone | 285—419 |
| 2,222,018 | 11/40 | Bruce | 285—317 X |
| 2,444,888 | 7/48 | Baumgardner. | |
| 2,487,470 | 11/49 | Osborn | 285—7 |
| 2,789,839 | 4/57 | Siebert | 285—7 |
| 2,848,254 | 8/58 | Millar | 285—415 X |
| 2,941,822 | 6/60 | Moecker | 285—7 |
| 3,017,654 | 1/62 | Allenby | 285—7 |
| 3,041,088 | 6/62 | Brandon | 285—33 |
| 3,051,925 | 8/62 | Felts | 339—91 |
| 3,056,852 | 10/62 | Sachs | 339—103 X |
| 3,083,041 | 3/63 | Owenmark | 285—323 |
| 3,146,051 | 8/64 | Woofter | 339—91 |

FOREIGN PATENTS

| | | |
|---|---|---|
| 129,944 | 5/46 | Australia. |
| 667,145 | 1/36 | Germany. |
| 945,049 | 6/56 | Germany. |
| 481,496 | 3/38 | Great Britain. |
| 511,751 | 8/39 | Great Britain. |
| 648,562 | 1/51 | Great Britain. |
| 858,475 | 1/61 | Great Britain. |
| 273,063 | 1/51 | Switzerland. |

CARL W. TOMLIN, *Primary Examiner.*